(12) United States Patent  
Ishikawa

(10) Patent No.: US 9,132,514 B2
(45) Date of Patent: Sep. 15, 2015

(54) SOLDER POWDER AND METHOD OF PRODUCING SOLDER POWDER

(75) Inventor: Yuichi Ishikawa, Tokyo (JP)

(73) Assignee: DOWA HOLDINGS CO., LTD., Tokyo (JP)

( * ) Notice: Subject to any disclaimer, the term of this patent is extended or adjusted under 35 U.S.C. 154(b) by 76 days.

(21) Appl. No.: 13/885,505

(22) PCT Filed: Nov. 18, 2010

(86) PCT No.: PCT/JP2010/070562

§ 371 (c)(1),
(2), (4) Date: May 15, 2013

(87) PCT Pub. No.: WO2012/066664

PCT Pub. Date: May 24, 2012

(65) Prior Publication Data

US 2013/0244034 A1     Sep. 19, 2013

(51) Int. Cl.
*B22F 9/04* (2006.01)
*B23K 35/02* (2006.01)
*B22F 9/06* (2006.01)
*C22C 1/04* (2006.01)

(52) U.S. Cl.
CPC ............... *B23K 35/0244* (2013.01); *B22F 9/04* (2013.01); *B22F 9/06* (2013.01); *C22C 1/0483* (2013.01); *B22F 2009/049* (2013.01); *Y10T 428/2982* (2015.01)

(58) Field of Classification Search
CPC ............. B23K 35/0244; Y10T 428/2982; B22F 9/04; B22F 9/06; B22F 2009/049; C22C 1/0483
USPC ............................... 428/402; 241/22; 75/335
IPC ....... B22F 9/06, 9/04, 2009/049; C22C 1/0483; B23K 35/0244
See application file for complete search history.

(56) References Cited

U.S. PATENT DOCUMENTS

| 5,965,197 A | 10/1999 | Jin et al. |
| 6,290,745 B1 | 9/2001 | Schulze et al. |
| 6,580,169 B2 * | 6/2003 | Sakuyama et al. ............ 257/738 |
| 6,630,742 B2 * | 10/2003 | Sakuyama ..................... 257/772 |
| 2005/0217427 A1 | 10/2005 | Suthersan et al. |
| 2009/0047773 A1 * | 2/2009 | Mitchell et al. ............... 438/478 |

FOREIGN PATENT DOCUMENTS

| DE | 4402042 A1 | 6/1994 |
| DE | 10056732 A1 | 5/2002 |
| EP | 1623791 A2 | 2/2006 |
| EP | 1918063 A1 | 5/2008 |
| JP | 64-000204 * | 1/1989 |
| JP | 64-000204 A | 1/1989 |
| JP | 01-139710 A | 6/1989 |
| JP | 05-033017 * | 2/1993 |
| JP | 05-033017 A | 2/1993 |
| JP | H06-057355 A | 3/1994 |
| JP | H06-346118 A | 12/1994 |
| JP | H08-090277 A | 4/1996 |
| JP | 2002-519509 A | 7/2002 |
| JP | 2004-098118 A | 4/2004 |
| JP | 2004-211155 A | 7/2004 |
| JP | 2004-211156 A | 7/2004 |
| JP | 2008-100262 A | 5/2008 |
| JP | 2009-199746 * | 9/2009 |
| JP | 2009-199746 A | 9/2009 |
| WO | WO-00/00313 A2 | 1/2000 |
| WO | WO-2009/011981 A2 | 1/2009 |

OTHER PUBLICATIONS

International Search Report, mailed Mar. 1, 2011.
Extended Search Report issued in European Patent Application No. 10859811.1, dated Apr. 7, 2015.
Office Action issued in Chinese Patent Application No. 201080070220.1, dated Mar. 23, 2015.
Research and Performance Analysis on Mechanism of Hyperfine Stirring Mill, Huang Shi-hong, China Master's Theses Full-text Database (electronic periodicals) Engineering Technology vol. I, B015-18, May, 2007.

* cited by examiner

*Primary Examiner* — Leszek Kiliman
(74) *Attorney, Agent, or Firm* — Fishman Stewart Yamaguchi PLLC

(57) ABSTRACT

A solder powder having an average particle diameter of, for example, 0.05 μm or more and less than 3 μm is obtained by a method of producing a solder powder, including the steps of: putting solid or liquid metal, a non-aqueous solvent, and crushing balls having a diameter of 0.05 mm to 5 mm into a container to obtain a mixture; heating the mixture to 150° C. or higher and stirring the mixture; separating the crushing balls from the mixture after the stirring to obtain a mixture of the solder powder and the non-aqueous solvent; and performing solid-liquid separation on the mixture of the solder powder and the non-aqueous solvent to obtain a solder powder.

8 Claims, 6 Drawing Sheets

SOLDER POWDER AND METHOD OF PRODUCING SOLDER POWDER

BACKGROUND OF THE INVENTION

1. Field of the Invention

The present invention relates to a solder powder having a fine particle diameter and a method of producing the solder powder.

2. Description of the Related Art

Electronic devices such as mobile communication devices and the like are increasingly downsized and electronic components and electronic circuits installed therein are increasingly downsized, and this tendency is considered to continue in the future. The sizes of the components and circuits using a solder paste containing a solder powder are reduced, and therefore a solder paste conforming to the requirements of the fine pitch soldering technique corresponding to the line width or diameter of about 100 µm for a through hole of a substrate and wiring of an IC chip is required. In this case, the average particle diameter of the solder powder combined in the solder paste to be used is sometimes desired to be 5 µm or less. To cope with a possible future request to further downsize the electronic components and circuits, it is conceivable that a solder powder having an average particle diameter of less than 3 µm and further an average particle diameter of less than 1 µm will be increasingly requested as the solder powder to be combined in the solder paste.

Conventionally, most of solder powders have been produced by the disk atomization method and the gas atomization method, but it has been difficult to obtain a solder powder having an average particle diameter of 10 µm or less by these methods. Patent Document 1 discloses that a solder powder having an average particle diameter of 5 µm or less can be obtained even by the gas atomization method by adjusting the production conditions. However, there is no report that a solder powder having an average particle diameter of 4 µm or less was obtained by the disk atomization method or the gas atomization method.

Further, as the production method of the solder powder other than the disk atomization method and the gas atomization method, Patent Document 2 discloses a method of obtaining a solder powder by stirring oil and a solder melt. Patent Document 3 discloses a method of producing a reflow solder in the form of very fine particles. In any of the documents, a solder powder having an average particle diameter of 3 µm or less has not been obtained.

[Patent Document 1] Japanese Laid-open Patent Publication No. 2004-098118

[Patent Document 2] Japanese Unexamined Patent Application Publication (Translation of PCT Application) No. 2002-519509

[Patent Document 3] Federal Republic of Germany Laid-open Patent Publication No. 4402042

SUMMARY OF THE INVENTION

As described above, a solder powder having an average particle diameter of less than 3 µm has not been obtained. Hence, an object of the present invention is to obtain a solder powder having an average particle diameter of 0.05 µm or more and less than 3 µm and a method of producing the solder powder.

As a result of earnest study, the present inventors has completed the present invention by finding that a solder powder having an average particle diameter of 0.05 µm or more and less than 3 µm can be obtained by putting solid or liquid metal, a non-aqueous solvent, and crushing balls having a diameter of 0.05 mm to 5 mm into a container to obtain a mixture; heating the mixture to 150° C. or higher and stirring the mixture; separating the crushing balls from the mixture after the stirring to obtain a mixture of the solder powder and the non-aqueous solvent; and performing solid-liquid separation on the mixture of the solder powder and the non-aqueous solvent.

According to the present invention based on the finding, there are provided a solder powder having an average particle diameter of 0.05 µm or more and less than 3 µm, a solder powder having an average particle diameter of 0.05 µm or more and less than 1 µm, and a solder powder having an average particle diameter of 0.05 µm or more and less than 0.7 µm.

The solder powder may contain 90 mass % to 99.9 mass % of Sn and 0.05 mass % to 10 mass % of Ag. Further, the solder powder may contain 50 mass % to 90 mass % of Sn and 10 mass % to 50 mass % of Pb.

Further, according to the present invention from another aspect, there is provided a method of producing a solder powder, including the steps of: putting solid or liquid metal, a non-aqueous solvent, and crushing balls having a diameter of 0.05 mm to 5 mm into a container to obtain a mixture; heating the mixture to 150° C. or higher and stirring the mixture; separating the crushing balls from the mixture after the stirring to obtain a mixture of the solder powder and the non-aqueous solvent; and performing solid-liquid separation on the mixture of the solder powder and the non-aqueous solvent to obtain a solder powder.

A boiling point of the non-aqueous solvent may be 150° C. or higher. Further, the non-aqueous solvent may be an organic solvent having an aldehyde group or a hydroxy group. Further, the non-aqueous solvent may be an organic solvent containing at least one or more of a primary amino group, a secondary amino group, and a tertiary amino group.

Further, the stirring step may be performed by rotating a blade at a peripheral speed of 200 cm/sec to 20000 cm/sec. Further, the solid-liquid separation may be performed by centrifugation or a filter press. Further, after the solid-liquid separation of the mixture of the solder powder and the non-aqueous solvent, the solder powder may be cleaned with an organic solvent having a boiling point of 150° C. or lower. Further, a volume of the metal to a volume of the non-aqueous solvent may be 0.1 vol % to 20 vol %.

The solder powder of the present invention has a small average particle diameter of less than 3 µm and can be utilized as a solder paste material conforming to the requirements of the fine pitch soldering technique that is expected to be increasingly highly developed in the future.

DETAILED DESCRIPTION OF THE INVENTION

Figure 1:
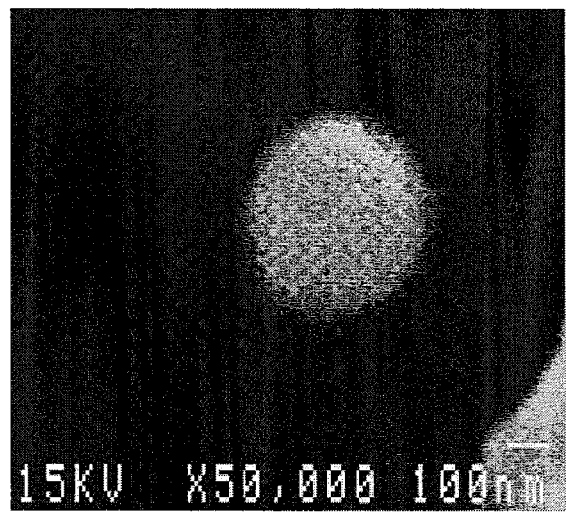
FIG. 1 is a view showing a SEM observation result of a dried solder powder according to Example 1.

Hereinafter, embodiments of the present invention will be described. Note that the embodiments do not limit the present invention.

<Alloy Composition of Solder Powder>

As alloy compositions of the solder powder in the present invention, various solder alloys can be used. A first example of the concrete alloy compositions is an alloy containing 90 mass % to 99.9 mass % of Sn and 0.05 mass % to 10 mass % of Ag. In this case, a lead-free solder powder containing no lead can be obtained. A second example is an alloy containing 50 mass % to 90 mass % of Sn and 10 mass % to 50 mass % of Pb. With these alloy compositions, a low-melting solder powder can be obtained, and the low melting point is advantageous in applying the production method of the present invention in which the solder powder is stirred in a solvent. The aforementioned alloys may contain one kind or two or more kinds of elements such as copper, zinc, bismuth, indium, antimony and so on.

<Average Particle Diameter of Solder Powder>

The average particle diameter of the solder powder is preferably 0.05 μm or more and less than 3 μm. The solder powder having an average particle diameter of more than 3 μm or more cannot sufficiently meet the demand of the fine-pitch soldering technique, whereas the solder powder having an average particle diameter of less than 0.05 μm may cause a problem due to quality change such as oxidation because of its high surface activity.

To cope with an increased demand level of the fine-pitch soldering technique following further downsizing of electronic components and electronic circuits, the average particle diameter of the solder powder is more preferably less than 1 μm, and further preferably 0.7 μm or less.

The solder powder of the present invention can be produced through the following steps.

(1) A step of putting solid or liquid metal, a non-aqueous solvent, and crushing balls having a diameter of 0.05 mm to 5 mm into a container to obtain a mixture.

(2) A step of heating the mixture to 150° C. or higher and stirring the mixture.

(3) A step of separating the crushing balls from the mixture to obtain a mixture of the solder powder and the non-aqueous solvent.

(4) A step of performing solid-liquid separation on the mixture of the solder powder and the non-aqueous solvent to obtain a solder powder.

As necessary, cleaning, drying and so on may be performed on the obtained solder powder.

<Raw Material Metal>

It is possible to use, as the raw material metal of the solder powder, a solder alloy having the same metal composition as that of the solder powder to be obtained, for example, a solder alloy containing 90 mass % to 99.9 mass % of Sn and 0.05 mass % to 10 mass % of Ag, a solder alloy containing 50 mass % to 90 mass % of Sn and 10 mass % to 50 mass % of Pb, or a mixture of metals that are the raw materials of the solder alloys. To obtain the solder powder having a uniform metal composition with more ease, use of an alloy is preferable.

<Non-Aqueous Solvent>

As the non-aqueous solvent in the present invention, a non-aqueous solvent having a boiling point of 150° C. or higher is preferable, and a non-aqueous solvent having a boiling point of 200° C. or higher is particularly preferable. As will be described later, to obtain the solder powder, a non-aqueous solvent having a boiling point higher than the melting point of the solder powder to be obtained is preferable, but even a non-aqueous solvent having a boiling point at normal pressure lower than the melting point of the solder powder can also be used by increasing the atmospheric pressure using a pressure container as the container for stirring. However, a production apparatus needs to have a pressure resistant property, and therefore the boiling point is desirably 10° C. or more higher than the melting point of the solder powder to be obtained. Further, as the non-aqueous solvent, a solvent having a reducing property is further preferable because the solder powder is likely to react with oxygen and form an oxide on the surface.

For example, an example of the non-aqueous solvent is an alcohol-based solvent having a boiling point ranging from 150° C. to 400° C. Concretely, when the melting point of an Sn—Ag—Cu based solder is 218° C. and for obtaining a pulverized solder powder by performing a later-described stirring operation at normal pressure, the boiling point of the non-aqueous solvent is preferably 220° C. or higher and more preferably 250° C. or higher.

Concrete examples of the non-aqueous solvent include monohydric alcohol, or glycol being dihydric alcohol. Examples of the monohydric alcohol include, for example, butyl alcohol, amyl alcohol, hexyl alcohol, heptyl alcohol, octyl alcohol, decyl alcohol, nonyl alcohol, cyclopentanol, benzyl alcohol, cinnamyl alcohol and so on. Examples of glycol-based solvent include glycerin, ethylene glycol, diethylene glycol, triethylene glycol, propylene glycol, trimethylene glycol, butanediol, pentanediol, hexanediol, heptanediol, octanediol, nonanediol, decanediol, benzopinacol, hydrobenzoyl, cyclopentadiol, cyclohexanediol, glycolic acid amide, diethyleneglycol dimethyl ether, diethyleneglycol diethyl ether, propylene glycol monoethyl ether, diethylene glycol dibutyl ether, diethyleneglycol monoethyl ether acetate, propyleneglycol monomethylether acetate and so on, and examples of glycol-based solvent having a large molecular weight include polyethylene glycol, polyethylene glycol ester, and polyethylene glycol ether. In particular, the glycol-, diol-based solvent has two hydroxy groups and therefore has polarity to desirably contribute to dispersion property of powder. The solvent contains, for example, —$CH_2$—CHOH, or —CHR—CHOH, —$CR_1R_2$—CHOH, =CHCHOH, =CRCHOH (R, $R_1$, $R_2$: side chain) in molecules and has a boiling point of at least 100° C. or higher. Further, an organic compound having an aldehyde group —CHO has similar effects, and examples of aliphatic saturated aldehyde include lauraldehyde, tridecylaldehyde, myristicaldehyde, caproicaldehyde, heptaldehyde, pentadecylaldehyde, palmitaldehyde, margaricaldehyde, and stearicaldehyde. An example of aliphatic saturated dialdehyde is, for example, succindialdehyde, an example of aliphatic unsaturated aldehyde is crotonaldehyde, examples of aromatic aldehyde include benzaldehyde, tolualdehyde, salicylaldehyde, cinnamicaldehyde, naphthaldehyde, and so on, and an example of heterocyclic aldehyde is furfural. Examples of amine-based reducing solvent include hexylamine, heptylamine, octylamine, undecylamine, tridecylamine, tetradecylamine, pentadecylamine, cetylamine, dibutylamine, diamylamine, cyclohexylamine, aniline, naphthylamine, toluidine and so on.

<Crushing Balls>

As material of the crushing balls used in the present invention, alumina balls, zirconia balls, mullite balls, and glass balls using ceramics, stainless steel balls and iron balls using metals and the like can be used. There is no limitation of material in particular, but zirconia, alumina, and stainless steel with high durability and less mixture of impurities into the solder powder are particularly preferable as the material of the crushing balls.

The crushing balls preferably have a grain diameter of 0.05 mm to 5 mm. Use of only crushing balls having a grain diameter larger than 15 mm makes it difficult to obtain the objective solder powder having a fine particle diameter, whereas use of only crushing balls having a grain diameter of less than 0.05 mm sometimes requires much time for the solid-liquid separation after the stirring.

To obtain a solder powder having a smaller particle diameter, the grain diameter of the crushing balls is more preferably 0.1 to 5 mm, more preferably 0.1 to 3 mm, further preferably 0.1 to 1 mm. It is also possible to use the crushing balls with a large grain diameter and with a small grain diameter in combination. In this case, the large ball size does not need to be stuck to a grain diameter of 15 mm and may be, for example, a grain diameter of 30 mm. The crushing balls need to include at least 50 mass % of crushing balls having a grain diameter of 0.05 mm to 15 mm.

On the surface of the crushing balls, diamond-like carbon (DLC), a compound of B, C, N and the like, which are material to which the solder is not likely to adhere can be formed.

<Volume Ratio of Mixture>

As for the volume ratio of the mixture, the volume of the metal material to the volume of the non-aqueous solvent to be used is preferably 0.1 vol % to 20 vol %, and more preferably 0.1 vol % to 10 vol %. The volume of the crushing balls to the volume of the non-aqueous solvent to be used is preferably 20 vol % to 600 vol %. When the volume of the metal material is less than 0.1 vol %, the productivity decreases, whereas when the volume of the metal material is more than 20 vol %, the particle diameter of the solder powder to be obtained does not sometimes become sufficiently small. When the volume of the crushing balls is less than 20 vol %, the particle diameter of the solder powder to be obtained does not sometimes become sufficiently small, whereas when the volume of the crushing balls is more than 600 vol %, the crushing balls are sometimes brought into a state that a large amount of the material metal adheres to the surface of the crushing balls. It is more preferable to adjust the volume ratio of the crushing balls to the non-aqueous solvent so that when the mixture is kept still in the container, the height of the upper surface of the non-aqueous solvent becomes flush with the upper surface of the crushing balls, thereby easily obtaining the solder powder of fine particles.

<Heating and Stirring Step>

By heating and stirring the mixture of the metal material, the non-aqueous solvent and the crushing balls, the solder powder having an average particle diameter of 0.05 μm or more and less than 3 μm can be produced.

The atmosphere for heating and stirring is preferably an inert gas or a reducing gas. When the atmosphere is air, a thick oxide film is sometimes formed on the surface of the produced solder powder, and therefore a lower oxygen concentration in the atmosphere is more preferable. Examples of the inert gas include nitrogen, argon and the like, and examples of the reducing gas include hydrogen, and a mixed gas of hydrogen and an inert gas.

In heating and stirring, the heating temperature of the mixture only needs to be higher than the melting point of the alloy composition of the solder powder to be obtained, and it is preferable heat the mixture to a temperature 5° C. or more higher than the melting point. If the heating temperature is close to the melting point, high temperature control property is required, resulting in increased facility cost. The heating temperature is set to a temperature lower than the boiling point of the non-aqueous solvent to be used (in the case of heating and stirring under a pressure, the boiling point under the pressure). The heating temperature does not provide special effect even if it is increased to be 50° C. or more higher than the melting point of the alloy composition, and can be set to equal to or lower than a temperature obtained by adding 50° C. to the melting point.

The stirring can be performed by rotating a stirring blade and may be performed by using a crusher capable of using the crushing balls, such as a mill or the like. The crushing conditions such as the number of rotations and so on only need to be arbitrarily selected according to the contents of the mixture and the average particle diameter of the solder powder to be obtained, and the average particle diameter of the solder powder to be obtained can be decreased by increasing the number of rotations of the stirring blade and the like. For example, when using a stirring blade, the number of rotations thereof can be set to a range of 100 to 100000 rpm, and the peripheral speed of the stirring blade can be set to a range of 100 to 5000 cm/sec.

<Separation of Crushing Balls>

After the heating and stirring, the mixture is cooled to a temperature 10° C. or more lower than the melting point of the solder powder while performing the stirring. Thereafter, the crushing balls are separated from the mixture by a publicly known means such as passing through a mesh or the like to obtain a mixture of the solder powder and the non-aqueous solvent.

<Solid-Liquid Separation>

The solid-liquid separation is performed on the mixture of the solder powder and the non-aqueous solvent obtained in the preceding step. The solid-liquid separation can be performed by a publicly known method such as centrifugation, filtration by a filter press or the like. Note that if the non-aqueous solvent used poses no problem as a dispersion medium of the solder powder, the solid-liquid separation does not need to be performed.

<Cleaning and Drying>

The solder powder subjected to the solid-liquid separation can be cleaned with a solvent. Preferable examples of the solvent include organic solvents of alcohol with a low boiling point such as methanol, ethanol and so on. After the cleaning, drying is performed by a method without high-temperature heating, such as vacuum drying or the like, whereby the solder powder with less used non-aqueous solvent residual can be obtained.

EXAMPLES

Example 1

Examples for producing an Sn—Ag—Cu based solder powder will be described below. 5 g of a solder alloy wire having a diameter of 1 mm with a composition of 99 mass % of Sn, 0.3 mass % of Ag, and 0.7 mass % of Cu was weighed out, and the solder alloy was put into a 300 mL separable flask. Then, 300 g of zirconia balls having a diameter of 1 mm were put into the separable flask and 50 mL of tetraethylene glycol was put into the separable flask to obtain a mixture. Then, an upper cover of the separable flask was sealed, nitrogen gas was supplied at 100 mL/min to perform gas replacement for 10 minutes. Then, while stirring was being performed by rotating at 700 rpm a stirring blade made of stainless steel having a rotation diameter of 6 cm set in the separable flask, the mixture was heated up to 230° C. After keeping the mixture at 230° C. for 1 hour, the heating was stopped while the stirring state was kept to perform natural cooling. At the stage where the mixture reached 120° C. or lower, the rotation of the stirring blade was stopped. Then, by passing the mixture through a net of 150-mesh nylon cloth, zirconia balls having a diameter of 1 mm were separated from the mixture. In the substance remaining after the filtration, a solvent (tetraethylene glycol) in which a pulverized solder powder was dispersed was recovered. For cleaning and removing tetraethylene glycol, the solvent in which the solder powder was dispersed was subjected to centrifugation under treatment conditions at 3000 rpm and for 5 minutes so that solid and liquid were separated, and supernatant was removed to recover the solder powder. Thereafter, cleaning was performed in the following manner. The recovered solder powder was stirred and mixed with 100 mL of ethanol to be dispersed again, and then subjected to centrifugation under treatment conditions of 3000 rpm and for 5 minutes so that solid and liquid were separated, and supernatant was removed to recover the solder powder. The operation of dispersing the recovered solder powder in ethanol and then separating solid and liquid by centrifugation was repeatedly performed five times. The obtained solder powder was dried in vacuum at 60° C., resulting in a dried solder powder.

The dried solder powder was investigated for the presence or absence of a peak of the hydroxy group of tetraethylene glycol by a reflection-type FT-IR (manufactured by Perkin Elmer, Spectrum 100), but the peak was not found.

Figure 2:
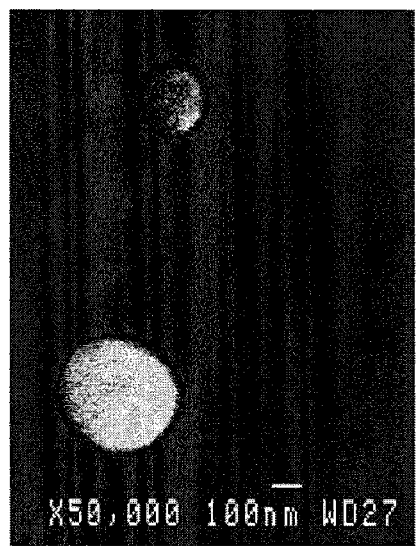
FIG. 2 is a view showing the SEM observation result of the dried solder powder according to Example 1.
Figure 3:
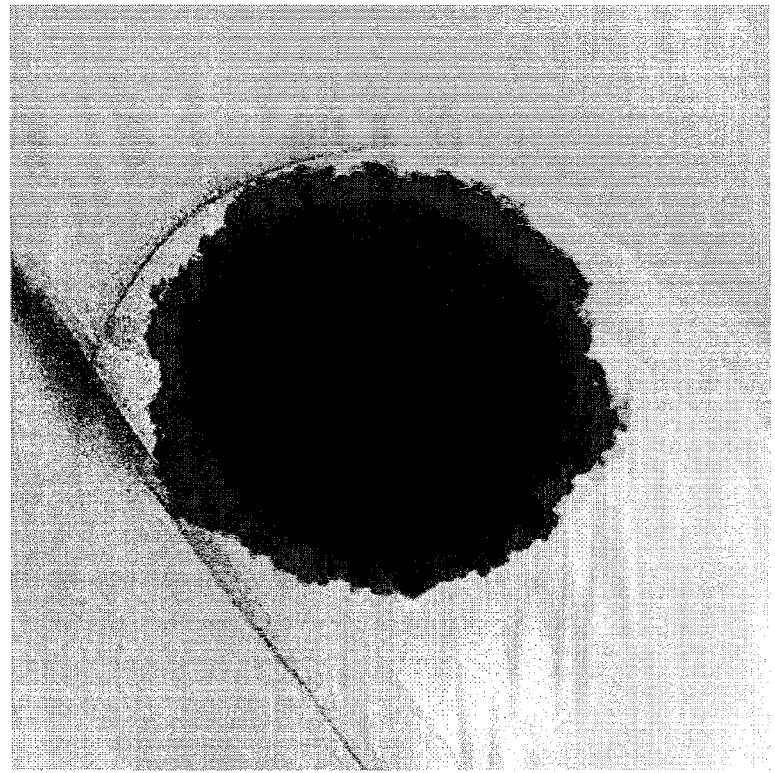
FIG. 3 is a view showing a TEM observation result of the dried solder powder according to Example 1.
Figure 4:
FIG. 4 is a view showing the TEM observation result of the dried solder powder according to Example 1.

As a result of SEM observation for the dried solder powder, a spherical powder as shown in FIG. 1, FIG. 2 was obtained. Further, as a result of TEM observation for the dried solder powder, it was found that the particle of the solder powder was in the form in which fine particles of 30 nm or less existed on the particle surface as shown in FIG. 3, FIG. 4. This form was the same in other examples.

Figure 5:
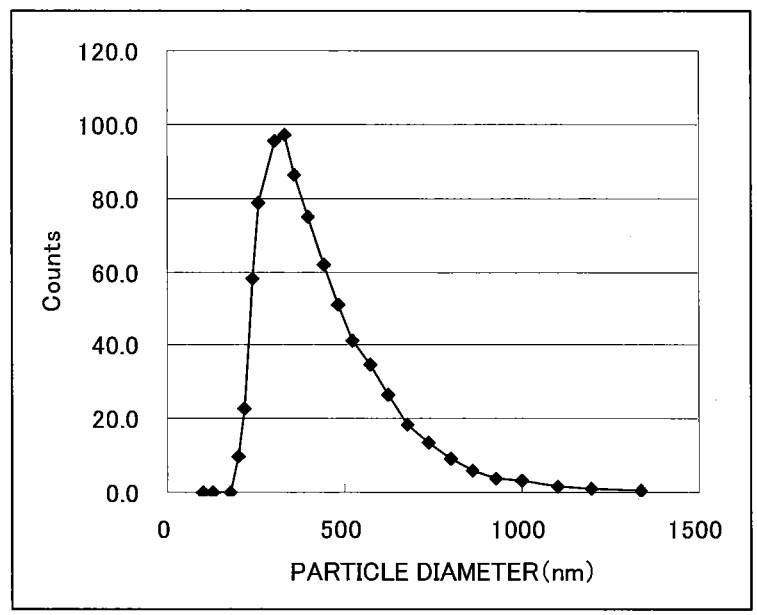
FIG. 5 is a graph illustrating a particle size distribution of the dried solder powder according to Example 1.
Figure 6:
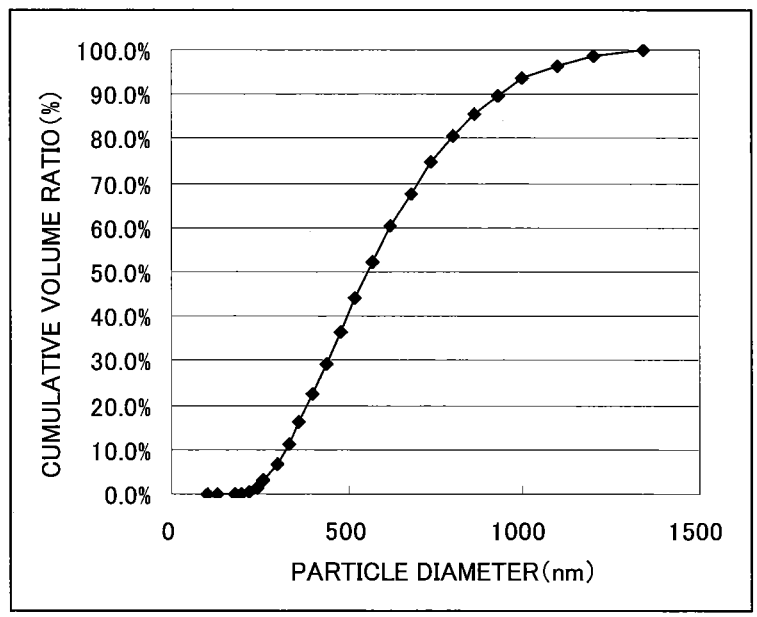
FIG. 6 is a graph illustrating a cumulative distribution of the dried solder powder according to Example 1.

A particle size distribution and a cumulative distribution of the produced powder are illustrated in FIG. 5, FIG. 6. From FIG. 5, it was found that an average particle diameter D50 was 550 nm.

Note that in this application, 0.3 g of the solder powder was put into 30 mL of isopropyl alcohol and treated for 5 minutes by a 45 W ultrasonic cleaner, and a cumulative 50 mass % particle diameter (D50) obtained when measuring the particle diameter of the treated solution using MICROTRAC 9320-X100 (manufactured by Honeywell-Nikkiso) was regarded as the average particle diameter of a silver powder. The average particle diameter D50 is described here. When the particle size distribution of the whole solder powder to be measured is obtained and a cumulative curve is obtained with the total volume of the silver powder as 100%, the particle diameters at points where the cumulative curve is at 10%, 50%, 90% are expressed as D10, D50, D90 respectively. Further, D50 that is a cumulative median diameter is regarded as the average particle diameter.

Example 2

A dried solder powder was obtained by the same method as that of Example 1 except that the diameter of the crushing balls was changed from 1 mm to 0.3 mm, and evaluated.

The dried solder powder was investigated for the presence or absence of a peak of the hydroxy group of tetraethylene glycol by the reflection-type FT-IR, but the peak was not found.

Figure 7:
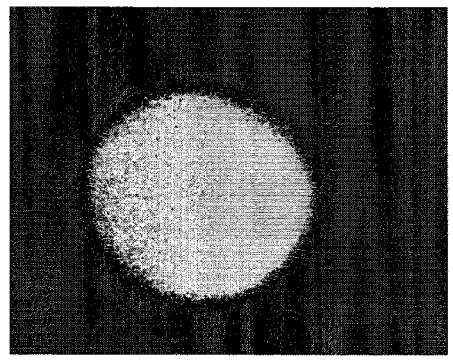
FIG. 7 is a view showing a SEM observation result of a dried solder powder according to Example 2.
Figure 8:
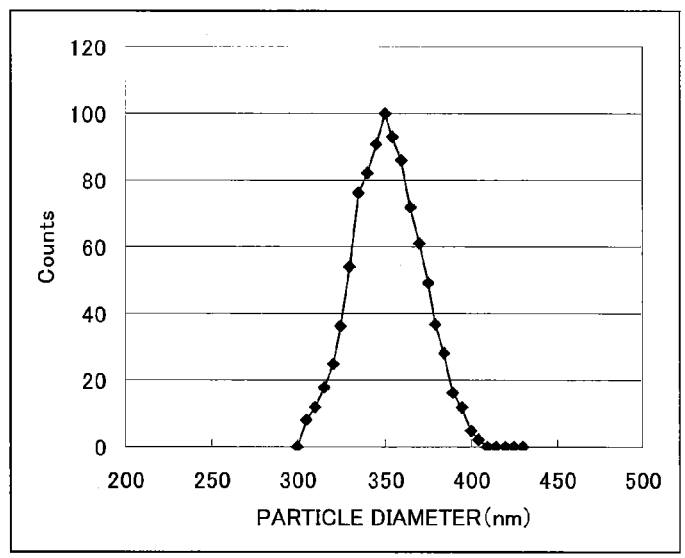
FIG. 8 is a graph illustrating a particle size distribution of the dried solder powder according to Example 2.
Figure 9:
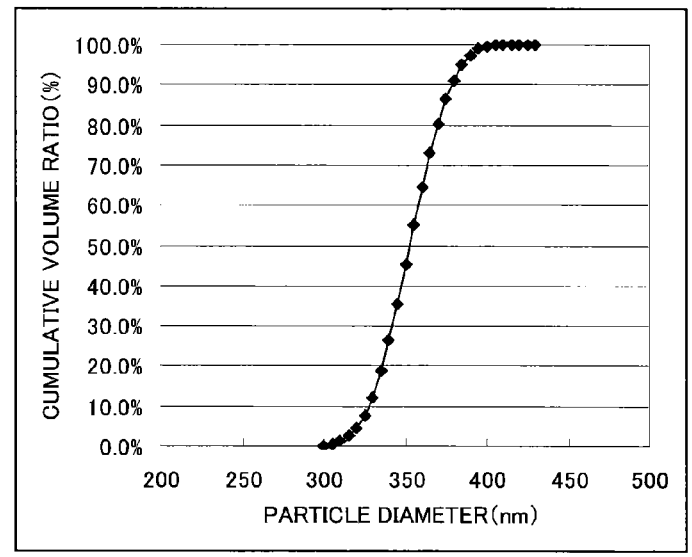
FIG. 9 is a graph illustrating a cumulative distribution of the dried solder powder according to Example 2.

As a result of SEM observation for the dried solder powder, a spherical powder as shown in FIG. 7 was obtained. A particle size distribution and a cumulative distribution of the dried solder powder are illustrated in FIG. 8, FIG. 9. From FIG. 7, it was found that the average particle diameter D50 was 360 nm.

Example 3

Six kinds of dried solder powders were obtained by the same method as that of Example 2 except that the non-aqueous solvent was changed from tetraethylene glycol to triethylene glycol and the number of rotations of the stirring blade was changed from 700 rpm to six kinds of number of rotations listed in Table 1, and evaluated.

TABLE 1

| Sample number | Stirring blade rotation number (rpm) | Stirring blade peripheral speed (cm/sec) | Dried solder powder average particle diameter D50 (µm) |
| --- | --- | --- | --- |
| Sample 1 | 817 | 256 | 0.36 |
| Sample 2 | 1167 | 366 | 0.29 |
| Sample 3 | 1750 | 550 | 0.24 |
| Sample 4 | 2333 | 733 | 0.19 |
| Sample 5 | 2917 | 916 | 0.16 |
| Sample 6 | 3000 | 1099 | 0.15 |

The dried solder powders were investigated for the presence or absence of a peak of the hydroxy group of triethylene glycol by the reflection-type FT-IR, but the peak was not found.

Figure 10:
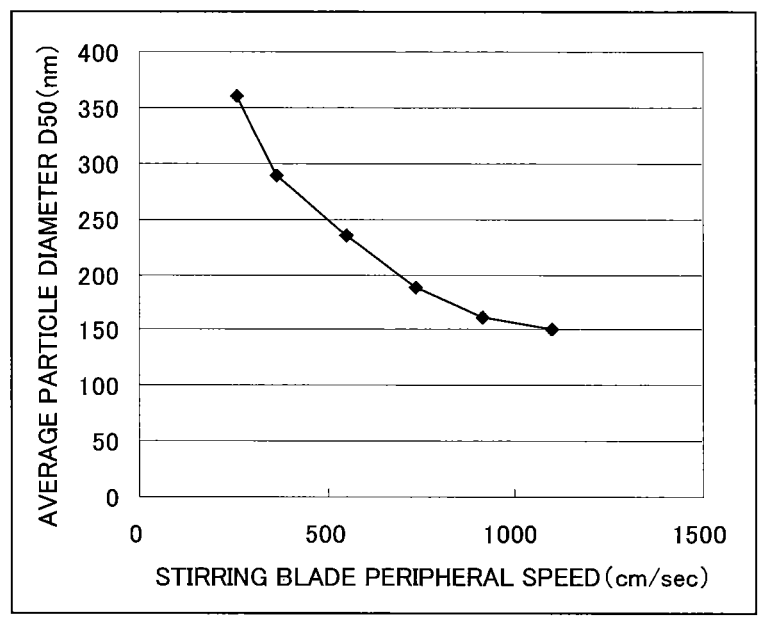
FIG. 10 is a graph illustrating a relation between a peripheral speed of a stirring blade and a particle diameter of a dried solder powder in Example 3.

The average particle diameters D50 of the dried solder powders are listed in Table 1. The result showed that as the stirring speed (peripheral speed) increased, the pulverization of the solder powder proceeded, showing the relation between the peripheral speed of the stirring blade and the particle diameter as illustrated in FIG. 10.

Example 4

Five kinds of dried solder powders were obtained by the same method as that of Example 1 except that the heating temperature of the mixture was changed from 230° C. to 235° C., the net for separating the crushing balls was changed from the net of 150-mesh nylon cloth to a net of 200-mesh nylon cloth, and the diameter of the crushing balls was changed from 1 mm to five kinds of diameters listed in Table 2, and evaluated.

TABLE 2

| Sample number | Crushing ball diameter (mm) | Dried solder powder average particle diameter D50 (µm) |
| --- | --- | --- |
| Sample 1 | 0.3 | 0.32 |
| Sample 2 | 1 | 0.58 |
| Sample 3 | 5 | 3 |
| Sample 4 | 10 | 12 |
| Sample 5 | 20 | 15 |

The dried solder powders were investigated for the presence or absence of a peak of the hydroxy group of tetraethylene glycol by the reflection-type FT-IR, but the peak was not found.

Figure 11:
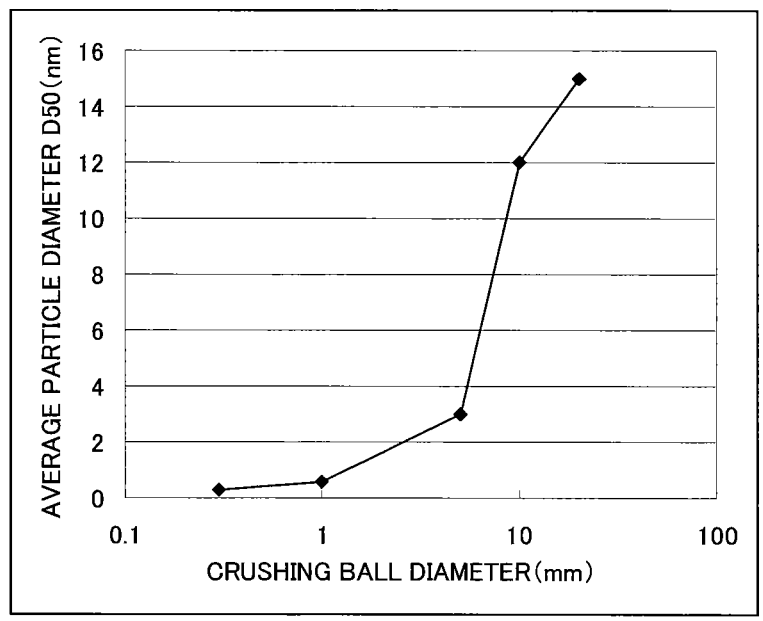
FIG. 11 is a graph illustrating a relation between a diameter of crushing balls and a particle diameter of a dried solder powder in Example 4.

The average particle diameters D50 of the dried solder powders are listed in Table 2. The result showed that as the diameter of the crushing balls increased, the particle diameter of the obtained solder powder increased, showing the relation between the diameter of the crushing balls and the particle diameter of the obtained solder powder as illustrated in FIG. 11.

Example 5

Ten kinds of dried solder powders were obtained by the same method as that of Example 4 except that the material of the crushing balls was changed from zirconia to alumina, the stirring holding time at 235° C. was changed from 1 hour to 3 hours, and the mass of the solder alloy wire used was changed to ten kinds of masses listed in Table 3, and evaluated.

TABLE 3

| Sample number | Solder alloy wire mass (g) | Volume ratio of solder alloy wire to non-aqueous solvent (vol %) | Dried solder powder average particle diameter D50 (μm) |
| --- | --- | --- | --- |
| Sample 1 | 0.073 | 0.02 | 0.54 |
| Sample 2 | 0.36 | 0.10 | 0.54 |
| Sample 3 | 0.73 | 0.20 | 0.55 |
| Sample 4 | 2.2 | 0.60 | 0.55 |
| Sample 5 | 3.6 | 0.99 | 0.55 |
| Sample 6 | 7.2 | 1.96 | 0.58 |
| Sample 7 | 10.6 | 2.91 | 0.65 |
| Sample 8 | 14.0 | 3.85 | 0.80 |
| Sample 9 | 20.7 | 5.66 | 1.6 |
| Sample 10 | 33.2 | 9.09 | 3.0 |

The dried solder powders were investigated for the presence or absence of a peak of the hydroxy group of tetraethylene glycol by the reflection-type FT-IR, but the peak was not found.

Figure 12:
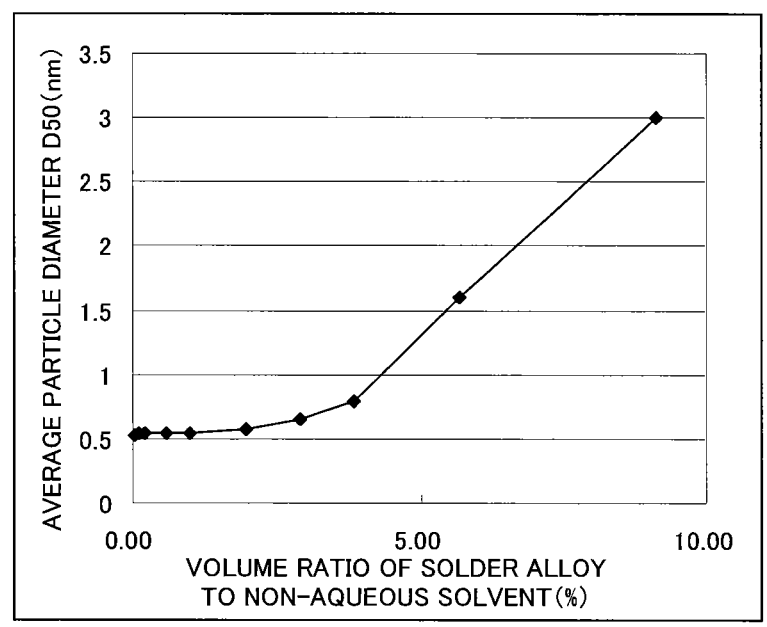
FIG. 12 is a graph illustrating a relation between a volume ratio of a solder alloy to a non-aqueous solvent and an average particle diameter of a dried solder powder in Example 5.

The average particle diameters D50 of the dried solder powders are listed in Table 3. The result showed that as the volume ratio of the raw material metal (solder powder) to the non-aqueous solvent increased, the particle diameter of the obtained solder powder increased. The relation between the volume ratio of the raw material metal (solder powder) to the non-aqueous solvent and the average particle diameter of the obtained solder powder is illustrated in FIG. 12.

Example 6

Examples of an Sn—Pb based solder powder will be described below.

A dried solder powder was obtained by the same method as that of Example 5 except that the composition of the solder alloy wire was changed from 99 mass % of Sn, 0.3 mass % of Ag, and 0.7 mass % of Cu to 60 mass % of Sn and 40 mass % of Pb, the mass of the solder alloy wire used was one kind of 5 g, and the temperature at which the stirring after finish of the heating and stirring was changed from 120° C. to 90° C., and evaluated.

The dried solder powder was investigated for the presence or absence of a peak of the hydroxy group of tetraethylene glycol by a reflection-type FT-IR, but the peak was not found.

The average particle diameter D50 of the dried solder powder was 610 nm.

Example 7

A dried solder powder was obtained by the same method as that of Example 1 except that the composition of the solder alloy wire used was changed from 99 mass % of Sn, 0.3 mass % of Ag, and 0.7 mass % of Cu to 96.5 mass % of Sn, 3.0 mass % of Ag, and 0.5 mass % of Cu, the mass of the d solder alloy wire used was changed from 5 g to 10 g, and the amount of tetraethylene glycol was changed from 50 mL to 100 mL, and evaluated.

The dried solder powder was investigated for the presence or absence of a peak of the hydroxy group of tetraethylene glycol by the reflection-type FT-IR, but the peak was not found.

As a result of SEM observation for the dried solder powder, the shape of the solder powder was spherical. The average particle diameter D50 of the dried solder powder was 900 nm.

Example 8

A dried solder powder was obtained by the same method as that of Example 7 except that the composition of the metal material used was changed from the solder alloy wire containing 96.5 mass % of Sn, 3.0 mass % of Ag, and 0.5 mass % of Cu to an alloy containing 99.9 mass % of Sn and 0.1 mass % of Ag, and the heating temperature of the mixture was changed from 230° C. to 237° C., and evaluated.

The dried solder powder was investigated for the presence or absence of a peak of the hydroxy group of tetraethylene glycol by the reflection-type FT-IR, but the peak was not found.

As a result of SEM observation for the dried solder powder, the shape of the solder powder was spherical. The average particle diameter D50 of the dried solder powder was 950 nm.

Example 9

A dried solder powder was obtained by the same method as that of Example 7 except that the metal material used was changed from the solder alloy wire containing 96.5 mass % of Sn, 3.0 mass % of Ag, and 0.5 mass % of Cu to an alloy containing 94.0 mass % of Sn and 6.0 mass % of Ag, and the heating temperature of the mixture was changed from 230° C. to 240° C., and evaluated.

The dried solder powder was investigated for the presence or absence of a peak of the hydroxy group of tetraethylene glycol by the reflection-type FT-IR, but the peak was not found.

As a result of SEM observation for the dried solder powder, the shape of the solder powder was spherical. The average particle diameter D50 of the dried solder powder was 900 nm.

Example 10

A dried solder powder was obtained by the same method as that of Example 7 except that the metal material used was changed from the solder alloy wire containing 96.5 mass % of Sn, 3.0 mass % of Ag, and 0.5 mass % of Cu to an alloy containing 93.0 mass % of Sn and 7.0 mass % of Ag, and the heating temperature of the mixture was changed from 230° C. to 245° C., and evaluated.

The dried solder powder was investigated for the presence or absence of a peak of the hydroxy group of tetraethylene glycol by the reflection-type FT-IR, but the peak was not found.

As a result of SEM observation for the dried solder powder, the shape of the solder powder was spherical. The average particle diameter D50 of the dried solder powder was 950 nm.

INDUSTRIAL APPLICABILITY

The present invention is applicable to a solder powder having a fine particle diameter and to a production method of the solder powder.

What is claimed is:

1. A method of producing a solder powder, comprising the steps of:
   putting solid or liquid metal, a non-aqueous solvent, and crushing balls having a diameter of 0.05 mm to 5 mm into a container to obtain a mixture;
   heating the mixture to 150° C. or higher and stirring the mixture;
   separating the crushing balls from the mixture after the stirring to obtain a mixture of the solder powder and the non-aqueous solvent; and
   performing solid-liquid separation on the mixture of the solder powder and the non-aqueous solvent to obtain a solder powder,
   wherein an average particle diameter of the solder powder is 0.05 μm or more and less than 3 μm.

2. The method of producing a solder powder according to claim 1,
   wherein a boiling point of the non-aqueous solvent is 150° C. or higher.

3. The method of producing a solder powder according to claim 2,
   wherein the non-aqueous solvent is an organic solvent having an aldehyde group or a hydroxy group.

4. The method of producing a solder powder according to claim 2,
   wherein the non-aqueous solvent is an organic solvent containing at least one or more of a primary amino group, a secondary amino group, and a tertiary amino group.

5. The method of producing a solder powder according to claim 1,
   wherein the stifling step is performed by rotating a blade at a peripheral speed of 200 cm/sec to 20000 cm/sec.

6. The method of producing a solder powder according to claim 1,
   wherein the solid-liquid separation is performed by centrifugation or a filter press.

7. The method of producing a solder powder according to claim 1,
   wherein after the solid-liquid separation of the mixture of the solder powder and the non-aqueous solvent, the solder powder is cleaned with an organic solvent having a boiling point of 150° C. or lower.

8. The method of producing a solder powder according to claim 1,
   wherein a volume of the metal to a volume of the non-aqueous solvent is 0.1 vol % to 20 vol %.

* * * * *